(12) United States Patent
Joshi et al.

(10) Patent No.: US 11,921,787 B2
(45) Date of Patent: Mar. 5, 2024

(54) IDENTITY-AWARE DATA MANAGEMENT

(71) Applicant: NEEDL.AI INC., San Francisco, CA (US)

(72) Inventors: Sandeep Joshi, Pune (IN); Raghul Ravi, Pune (IN); Vikram Srinivasan, Pune (IN); Kuntal Shah, Pune (IN)

(73) Assignee: NEEDL.AI INC., San Francisco, CA (US)

( * ) Notice: Subject to any disclaimer, the term of this patent is extended or adjusted under 35 U.S.C. 154(b) by 0 days.

(21) Appl. No.: 17/812,538

(22) Filed: Jul. 14, 2022

(65) Prior Publication Data

US 2024/0020340 A1 Jan. 18, 2024

(51) Int. Cl.
*G06F 16/90* (2019.01)
*G06F 16/901* (2019.01)
*G06N 3/088* (2023.01)

(52) U.S. Cl.
CPC ......... *G06F 16/9024* (2019.01); *G06N 3/088* (2013.01)

(58) Field of Classification Search
None
See application file for complete search history.

(56) References Cited

U.S. PATENT DOCUMENTS

| | | | |
|---|---|---|---|
| 11,762,933 B2* | 9/2023 | Lou | G06F 16/288 707/722 |
| 2016/0055142 A1* | 2/2016 | Strassner | G06F 40/205 707/755 |
| 2021/0182317 A1 | 6/2021 | Gadek et al. | |
| 2023/0071715 A1* | 3/2023 | Shapira | H04L 51/212 |

OTHER PUBLICATIONS

International Search Report and Written Opinion received for PCT Patent Application No. PCT/US2023/069647, dated Oct. 24, 2023.

* cited by examiner

*Primary Examiner* — Jau Shya Meng
(74) *Attorney, Agent, or Firm* — Knobbe, Martens, Olson & Bear, LLP

(57) ABSTRACT

Systems and methods are provided for organizing communications of multiple communication services. Specifically, techniques are described for organizing data according to detected identities represented aggregate accounts across multiple communication services, as opposed to merely on the basis of accounts on such services. An identity-aware data management system is disclosed that can generate, on the basis of communications of a first party among multiple communication services, a reduced connection graph of the first party. The reduced connection graph of the first party can reflect second parties with whom the first party has communicated, each second party representing an aggregation of multiple accounts of a second party across communication services. The identity-aware data management system may then enable the first party to search, filter, or organize communications according to the reduced connection graph.

22 Claims, 8 Drawing Sheets

IDENTITY-AWARE DATA MANAGEMENT

BACKGROUND

Computing devices are widely used to exchange information between parties. A variety of mechanisms for such exchange exist, providing for data transmission across a variety of channels and according to a variety of protocols. In some cases, a data transmission channel may be proprietary. For example, a network service provider may provide a proprietary application through which users of the application can exchange information. In other cases, a channel may be non-proprietary. For example, multiple network service providers may offer to exchange information via a non-proprietary method, such as email. As the number of channels and amount of data exchanged grows, so does the difficulty of locating pertinent information across such channels.

DETAILED DESCRIPTION

Figure 1A:
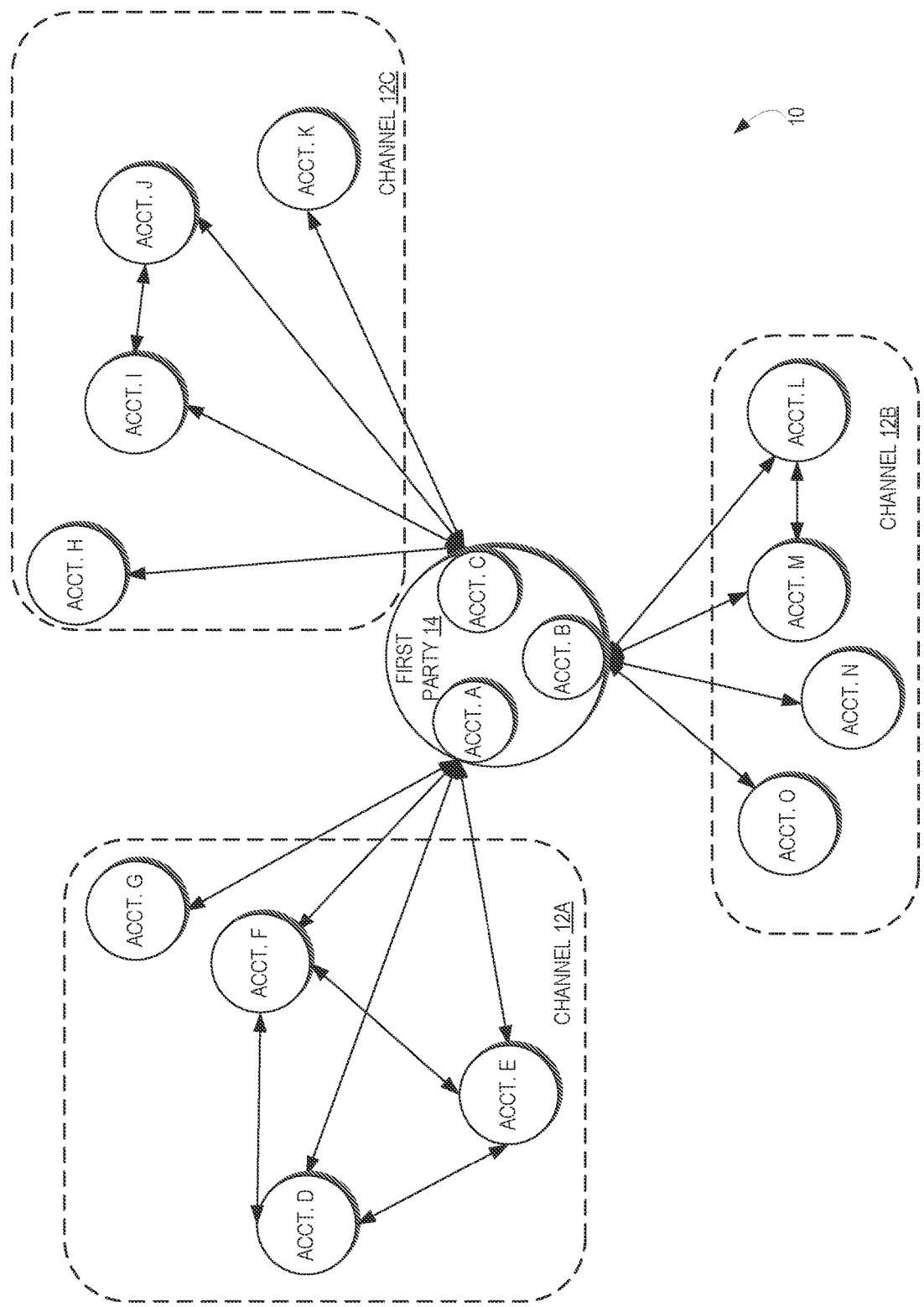
FIG. 1A is an illustrative visualization of a connection graph of an entity, the connection graph reflecting connections between multiple accounts of the entity on multiple communication channels and additional accounts on the communication channels.

Generally described, aspects of the present disclosure relate to organizing and presenting data of an entity across multiple communication channels according to a reduced connection graph for the entity. More specifically, embodiments of the present disclosure may generate a reduced connection graph for an entity, which aggregates second-party accounts on multiple communication channels of the entity into known identities, such that the entity is enabled to search for, sort, filter, or otherwise organize their data according to the known identities, as opposed to simply based on the second-party accounts. In particular, embodiments of the present disclosure address problems that stem from communications between parties occurring on multiple communication channels, inhibiting location of such communications unless a searching user recalls both the communication channel and an identifier of the other communicating party on that communication channel. Embodiments of the present disclosure solve such problems by providing for creation of a reduced connection graph for a searching user, which aggregates accounts of a second party communicator across multiple communication channels into a single aggregated identity, and enables searching for, sorting, or otherwise organizing data according the aggregated identity.

As discussed herein, an entity (sometimes referred to herein as a "first-party" entity or simply a "first party") may hold an account (or multiple accounts) on multiple communication channels, such as email, instant messenger or other messaging services, social networks, document management systems, publication platforms, and the like. Through these accounts, the entity may exchange information with additional entities (sometimes referred to herein as "second-party" entities or simply "second parties"), each corresponding to one or more accounts on the communication channels. While the identity of a second-party entity may be known to the first-party entity, that identity may not necessarily be apparent from account data of the second party. For example, a user "John Doe" may have a given email address that the first party knows corresponds to that user, but which cannot be immediately and unambiguously linked to that user without contextual information not contained within exchanges between the first party and John Doe. For example, John Doe may have an ambiguous email address of, e.g., "john@email.com", or non-identifying email address of, e.g., "awesome_user@email.com". Thus, it may be difficult for the first party user to search for correspondence with John Doe on the basis of that identity. Rather, the first party user may be required to recall a particular identifier of a second party on a given channel (e.g., the email address of the second party) in order to search for correspondence with that second party. Moreover, any given second party may hold accounts on multiple communication channels, or potentially multiple accounts on any communication channel. Thus, to identify a relevant communication of the second party, a first party user may be required to recall both the channel on which the communication was sent and the identifier of the second party on the communication channel. This can thus prevent efficient searching of communications, particularly where a user cannot recall such information. Moreover, this can prevent efficient organization of communications, as communications via different channels but stemming from the same second party may be considered distinct.

Embodiments of the present disclosure address these problems by providing for the presentation of communications between a first party and second parties according to programmatically identified identities of such second parties. More specifically, embodiments of the present disclosure can provide for an identity-aware data management system, which enables retrieval of communications between a first party and multiple second parties from multiple communication channels. Each communication may be associated with an account of the first party and an account of a second party on one of the communication channels. However, rather than simply organizing the data according to these accounts, the identity-aware data management system may enable the communications to be searched, filtered, arranged, or otherwise organized according to identities of the second party, which may be programmatically identified from the communications. Accordingly, rather than for example searching for emails from "john@email.com," a first party may be enabled to search for any emails from a corresponding second party, e.g., "John Doe." Further, each identity may represent an aggregate of multiple accounts of the second party across multiple communication channels. For example, the second party "John Doe" may be associated with an email address, an instant messenger address, one or more social media profiles, etc. Rather than separately searching communications according to each account, embodiments of the present disclosure may enable a first party to search for all communications by a second party by an identity of the second party, regardless of which communication channel or which accounts such communications occurred on.

To facilitate arrangement of communications according to known identities of second parties, embodiments of the present disclosure may generate a reduced connection graph of the first party, which identifies accounts in communication with the first party via one or more communication channels, and arranges such accounts into aggregated identities, each of which aggregates a set of accounts of a second party into the aggregated identity. For example, an aggregate identity may correspond to a given person "John Doe," and represent an aggregation of multiple accounts of John Doe across multiple communication channels. An identity-aware data managements system as disclosed herein may, using a reduced connection graph that includes such an aggregated identity, enable a first party to search for or otherwise arrange communications according to the known identity "John Doe," rather than requiring that arrangement occur on the basis of individual accounts of that second party.

Figure 1B:
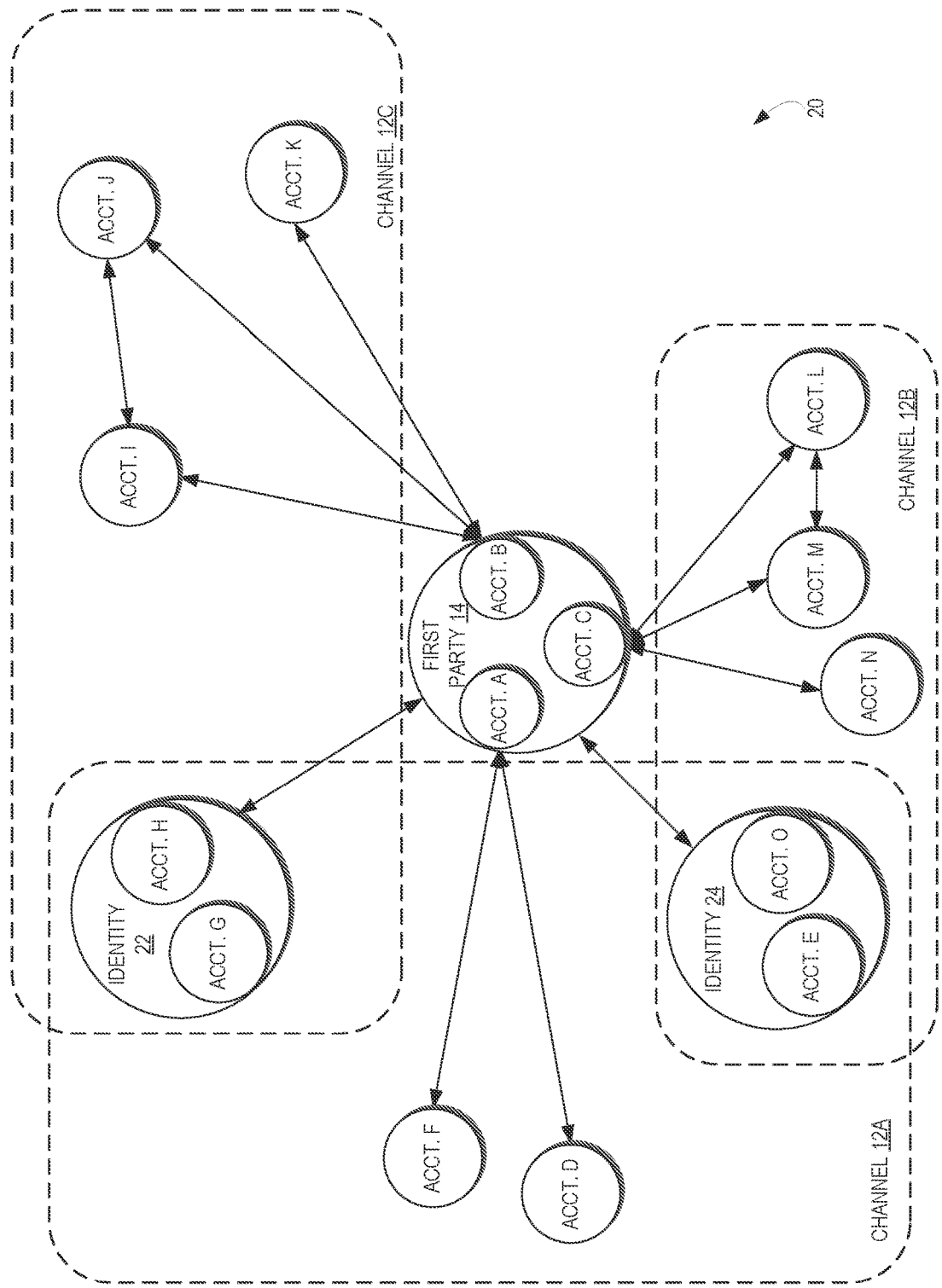
FIG. 1B is an illustrative visualization of a reduced connection graph corresponding to the connection graph of FIG. 1A, in which one or more additional accounts of the connection graph of FIG. 1A have been combined into an aggregated entity reflecting that the one or more additional accounts correspond to the same entity across multiple communication channels.

To further illustrate this concept, FIGS. 1A and 1B show connection graphs of a first party entity. The graph 10 of FIG. 1A is un-reduced—that is, no aggregation of accounts has occurred. The graph 20 of FIG. 1B is reduced, such that multiple accounts across communication channels are aggregated into aggregated identities. As discussed in more detail below, a reduced connection graph may in some embodiments be generated by first generating an unreduced connection graph, and then conducting a pairwise evaluation of accounts within the graph to determine when two such accounts correspond to the same identity and thus should be aggregated.

As shown in FIG. 1A, a first party 14 may hold multiple accounts on different communication channels, such as account A on channel 12A, account B on channel 12B, and account C on channel 12C. Through these channels 12A-C, the first party 14 may communicate with multiple additional accounts, shown as accounts D-O in FIG. 1A. Accordingly, nodes within the graph 10 can indicate accounts (or, when aggregated, an identity) within a communication channel, while edges indicate communications between those accounts, as indicated by communication data of the first party. For example, in graph 10, the first party 14 is in communication with each of accounts D-O, and at least some of accounts D-O are in communication with one another (e.g., by virtue of participating in a group conversation with the first party 14).

While each additional account may be associated with a second party, information about the additional accounts (or at least the information about the additional accounts available to the first party 14 via the channels 12) may not unambiguously identify the second party. Moreover, in some cases a single second party may hold multiple accounts across different (or even within the same) channel 12. For example, accounts E and 0 may both be held by a given second party. However, knowledge of this correspondence may depend on contextual information held by the first party, and not available within any individual channel 12. Moreover, any given channel 12 may not support communication across another channel 12. For example, each channel 12 may have a unique set of interfaces (e.g., web sites, applications, etc.) supporting communication on that channel 12 and not other channels 12. Thus, even if a first party is aware that a given second party holds multiple accounts, it may not be possible to link such accounts to facilitate, e.g., aggregation of communications of the second party across channels 12. Moreover, even if an interface did support communication over multiple channels, requiring a first party to manual link accounts to a given second party can be cumbersome, particularly when the number of contacts of the first party is large. It can therefore be difficult to search for and organize data on the basis of identities of second parties, as opposed to accounts.

To address this problem, embodiments of the present disclosure can generate a reduced connection graph, such as the reduced connection graph 20 of FIG. 1B. As shown in FIG. 1B, the reduced connection graph 20 maintains the accounts shown in the graph 10 of FIG. 1A, but aggregates at least some of these accounts into aggregated identities, such as identities 22 and 24. Each such identity represents multiple accounts identified as belonging to the same second party. In the example of FIG. 1B, each account of each identity is associated with a different communication channel 12. However, in some embodiments, an identity may represent aggregated accounts across a single channel 12. Because the accounts are aggregated or grouped in the manner shown in FIG. 1B, the total number of edges within the graph 20 is reduced relative to the graph 10. Moreover, because the reduced connection graph 20 associates multiple accounts of second parties into aggregated identities, use of the reduced connection graph 20 can facilitate searching, filtering, or organizing communications of the first party according to the aggregated identities, as opposed to simply according to accounts. Embodiments of the present disclosure can therefore enable a first party to, for example, search all communications from a given identity (e.g., identity 22) for a relevant communication, without requiring the first party to recall a particular channel 12 or account on that channel 12 on which the relevant communication occurred.

Further details regarding generation of a reduced connection graph are provided below. However, in brief, a reduced connection graph is generated in some embodiments by conducting a pairwise comparison of accounts within a prior (e.g., unreduced) connection graph, which pairwise comparison compares one or more attributes of a given pair of accounts to determine whether such accounts are likely to correspond to the same identity. Such attributes may include, for example, identifiers of the account (e.g., a username, email address, nickname, etc.), a frequency of correspondence with the account by the first party, and a "co-groupedness" of the two accounts, which as discussed in more detail below represents whether the two accounts participate in group communications with a similar set of other accounts or known second parties. Illustratively, an identity-aware data management system as disclosed herein may compare attributes of two accounts within a connection graph and determine a similarity score between like attributes of the two accounts. The identity-aware data management system may then group two accounts if the similarity score exceeds a threshold value. In some embodiments, the identity-aware data management system may enable the first party to verify whether two (or more) accounts correspond to the same second party. In some such embodiments, an algorithm for determining the similarity score may be updated based (in whole or in part) on the feedback. For example, the identity-aware data management system may utilize a machine learning algorithm to compare attributes of two accounts, and train the machine learning algorithm based on feedback from first party users.

After generating a reduced connection graph, the identity-aware data management system as disclosed herein may provide for searching, filtering, or otherwise arranging communications of the first party based on the reduced connection graph. For example, the identity-aware data management system may enable a first party to search for communications of a given second party, and return in response to such search a list of communications of the second party across all accounts of the second party, regardless of communication channel. As another example, the identity-aware data management system may enable a first party to sort communications by second party, as opposed to simply by account. Accordingly, use of a reduced communication graph can enable more efficient organization and exploration of communications.

As will be appreciated by one of skill in the art in light of the present disclosure, the embodiments disclosed herein improve the ability of computing systems to search, sort, locate, and retrieve data corresponding to communications of second parties. Moreover, the presently disclosed embodiments address technical problems inherent within computing systems; specifically, the difficulty of correlating data across multiple communication channels without explicit knowledge of the entity sources of such communications. These technical problems are addressed by the various technical solutions described herein, including an identity-aware data management system that generates reduced connection graphs based on similarities of attributes between accounts in communication with a first party, and that enables searching, filtering, and organizing such communications according to the reduced connection graph. Thus, the present disclosure represents an improvement in data management systems and computing systems in general.

The foregoing aspects and many of the attendant advantages of this disclosure will become more readily appreciated as the same become better understood by reference to the following description, when taken in conjunction with the accompanying drawings.

Figure 2:
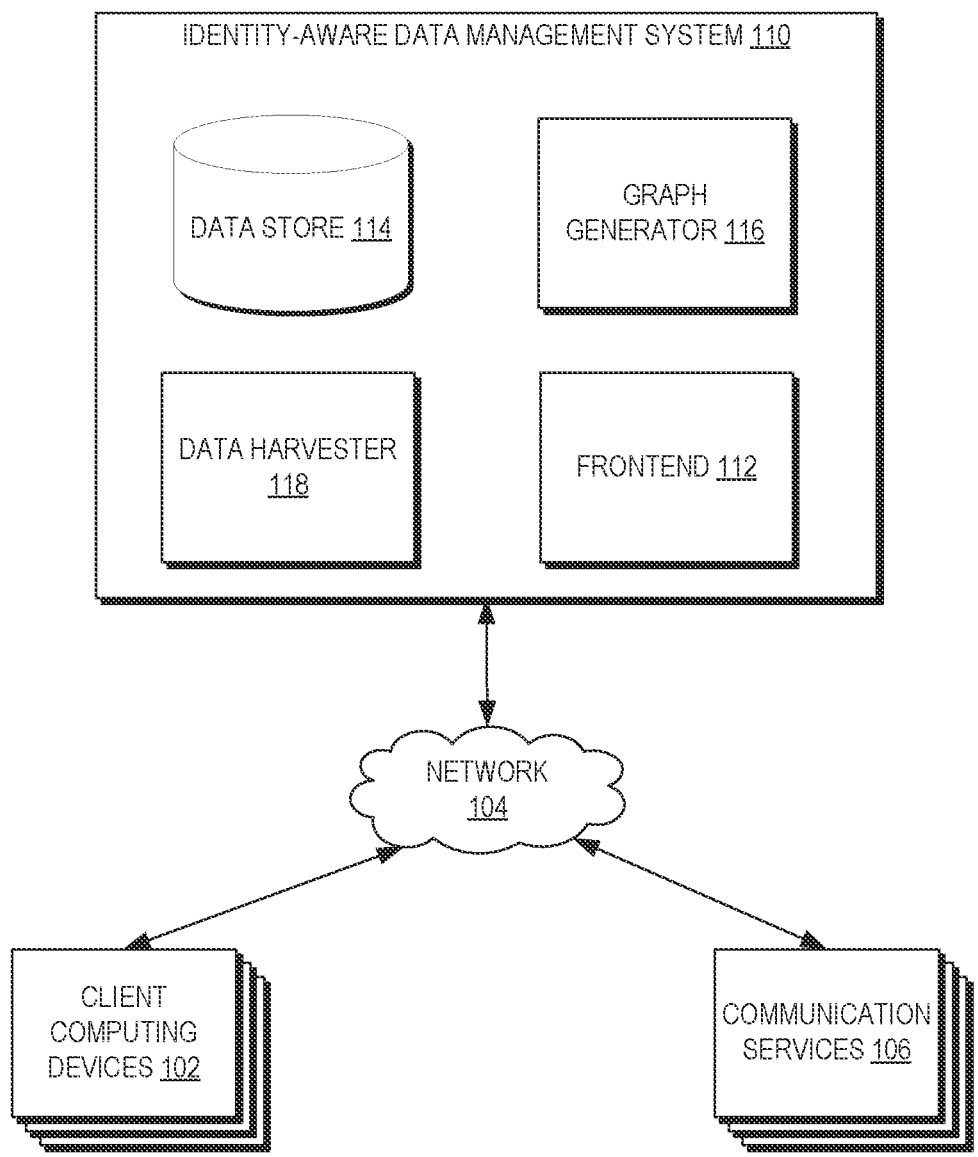
FIG. 2 depicts an example computing environment including an identity-aware data management system in which embodiments of the present disclosure can be implemented to generated reduced connection graphs, such as the reduced connection graph of FIG. 1B, and to organize data across multiple communication channels.

FIG. 2 depicts an example computing environment 100 including a identity-aware data management system 110 in which embodiments of the present disclosure can be implemented. Illustratively, the identity-aware data management system 110 can represent a network-accessible system providing for access to communications of a first party, including sorting such communications according to identities of second parties as represented within a reduced connection graph. The identity-aware data management system 110 can illustratively be accessed by client computing devices 102 over a network 104. Client computing devices 102 can include any network-equipped computing device, for example desktop computers, laptops, smartphones, tablets, e-readers, set top boxes, virtual reality headsets, gaming consoles, and the like. The network 104 can include any appropriate network, including an intranet, the Internet, a cellular network, a local area network or any other such network or combination thereof. In FIG. 2, the network 104 is the Internet. Protocols and components for communicating via the Internet or any of the other aforementioned types of communication networks are known to those skilled in the art of computer communications and thus, need not be described in more detail herein.

Client computing devices 102, each of which may be associated with a first party, can access the identity-aware data management system 110 via the network 104 to access, search, filter, and organize communication of second parties. Accordingly, the identity-aware data management system 110 can include multiple elements, which may represent distinct computing devices or logic executed on a single computing device, facilitating such functionality. For example, the identity-aware data management system 110 includes a frontend 112 enabling client computing devices 102 to access, search, filter, and organize communication of second parties. frontend 112 may provide various interfaces to client computing devices 102, such as graphical user interfaces (GUIs), command line interfaces (CLIs), application programming interfaces (APIs), and the like. For example, the frontend 112 may include a web server hosting web pages that facilitate the above-noted operations.

The frontend 112 may further enable client computing devices to configure access by the identity-aware data management system 110 to such communications. For example, the frontend 112 may enable a first party to specify accounts of the first party on various communication services 106, each of which may represent a distinct communication channel. For example, each communication service 106 may represent a network-accessible service providing for email, instant messaging or other messaging service, social network communications, or the like. A variety of such services, as well as techniques for implementing such services, are known in the art and thus are not described herein. A first party, using a client computing device 102, may authorize the identity-aware data management system 110 to access communications of the first party on the communication services 106. For example, the client computing device 102 may provide authentication information to the identity-aware data management system 110 enabling the identity-aware data management system 110 to access communication services 106 on behalf of the first party, which authentication information may be, for example, an authentication token for a communication service 106. To ensure privacy, such authentication information may be securely stored at the identity-aware data management system 110, such within data store 114. Various additional security measures may be taken to ensure privacy of first party communications, such as ensuring that the authentication information is securely stored (e.g., in encrypted form), is revocable at the discretion of the first party, is useable only by the identity-aware data management system 110, etc. One skilled in the art will appreciate that privacy of communications may be of paramount importance to first party users of the identity-aware data management system 110, and thus interactions between the identity-aware data management system 110 and communication services 106 may be sufficiently secured to ensure such privacy (e.g., by securing of authentication information as noted above, by use of secure and encrypted communication channels between the communication services 106 and the identity-aware data management system 110, etc.).

On receiving authentication information of client computing devices 102, the identity-aware data management system 110 may access the communication services 106 to retrieve communications of the authorizing first party. For example, where a communication service 106 is an email provider, the identity-aware data management system 110 may authenticate with the email provider as the first party and retrieve the email of the first party from the provider. In some embodiments, rather than retrieving the communication itself, the identity-aware data management system 110 may retrieve identifying information regarding the communication (e.g., a unique ID, or "UID") and metadata regarding the communication, such as a second parties to the communication, a time of the communication, a length of the communication, and the like. This information may then be stored within the data store 114, which can represent any persistent data storage. This information may facilitate operation of the identity-aware data management system 110, without requiring the identity-aware data management system 110 to directly access communications. For example, metadata of communications may be used to generate a reduced social graph as described herein and to facilitate searching or organizing of such communications. When a first party desires to search or organize communications according to the reduced connection graph, identifiers of such communications may be used to retrieve relevant communications "on-the-fly" from communication services 106, such that these communications need not be stored within the system 110. In some embodiments, the identity-aware data management system 110 may be configured to never access communications directly. For example, the identity-aware data management system 110 may provide an interface, such as a web document, to a client computing device 102 that facilitates searching, filtering, and organizing communications according to a reduced social graph, and which includes code, such as client-side scripting, executable at the client computing device 102 to retrieve communications from the communication services 106 identified during such operations. In this manner, the identity-aware data management system 110 may operate without requiring direct access to communications of the first party. In instances where communications are retrieved by the identity-aware data management system 110, the communications may be securely stored within the data store 114. In some cases, communications may be stored within the data store 114 only temporarily, such as during analysis of such communications to generate a reduced connection graph, and then deleted. Such temporary storage may again ensure privacy of communications.

To facilitate retrieval of communications from the communication services 106, the identity-aware data management system 110 can include one or more data harvesters 118. In one embodiment, a single data harvester 118 is provided. In another embodiment, multiple data harvesters 118 are provided, such as one for each communication service 106. Each such harvester 118 can be configured to interact with a communication service 106 in order to retrieve communications (or information regarding such communications such as metadata and a unique identifier) of a first party who has authorized the identity-aware data management system 110 to retrieve such communications. For example, where a communication service 106 provides an application programming interface (API) to retrieve communications (or information thereon), a harvester 118 may interact with that API to retrieve the communications. Additionally or alternatively, a harvester 118 may use other interfaces to access such communications. For example, the harvester 118 may act as a "scraper," using a non-programming user interface (such as a GUI provided via, e.g., a web browser) to retrieve communications. As discussed above, on retrieval of communications or information regarding such communications, such communications or information may be stored within the data store 114.

To facilitate searching, filtering, or organizing data according to known identities, the identity-aware data management system 110 can further include a graph generator 116 configured to generate a reduced connection graph for a first party based on the communications (or information thereon) stored within the data store 114. Generation of a reduced connection graph is discussed in more detail below. However, in brief, the graph generator 116 may retrieve communications (or associated information) from the data store 114 and generate a connection graph for a first party based on second party accounts associated with such communications. The graph generator 116 may then conduct a pairwise comparison of such second party accounts and group together accounts with sufficient similarities into aggregated identities, indicating that such accounts are expected to correspond to the same second party. As discussed herein, the frontend 112 may then enable sorting, filtering, or organizing of the communications of the first party based on the reduced social graph.

The identity-aware data management system 110 is depicted in FIG. 2 as operating in a distributed computing environment including several computer systems that are interconnected using one or more computer networks (not shown in FIG. 2). The identity-aware data management system 110 can also operate within a computing environment having a fewer or greater number of devices than are illustrated in FIG. 2. Thus, the depiction of the identity-aware data management system 110 in FIG. 2 should be taken as illustrative and not limiting to the present disclosure. For example, the identity-aware data management system 110 or various constituents thereof could implement various Web services components, hosted or "cloud" computing environments, and/or peer to peer network configurations to implement at least a portion of the processes described herein. Moreover, the environment 100 may include additional elements not shown in FIG. 2.

Further, the identity-aware data management system 110 may be implemented directly in hardware or software executed by hardware devices and may, for instance, include one or more physical or virtual servers implemented on physical computer hardware configured to execute computer executable instructions for performing various features that will be described herein. The one or more servers may be geographically dispersed or geographically co-located, for instance, in one or more data centers. In some instances, the one or more servers may operate as part of a system of rapidly provisioned and released computing resources, often referred to as a "cloud computing environment."

Figure 3:
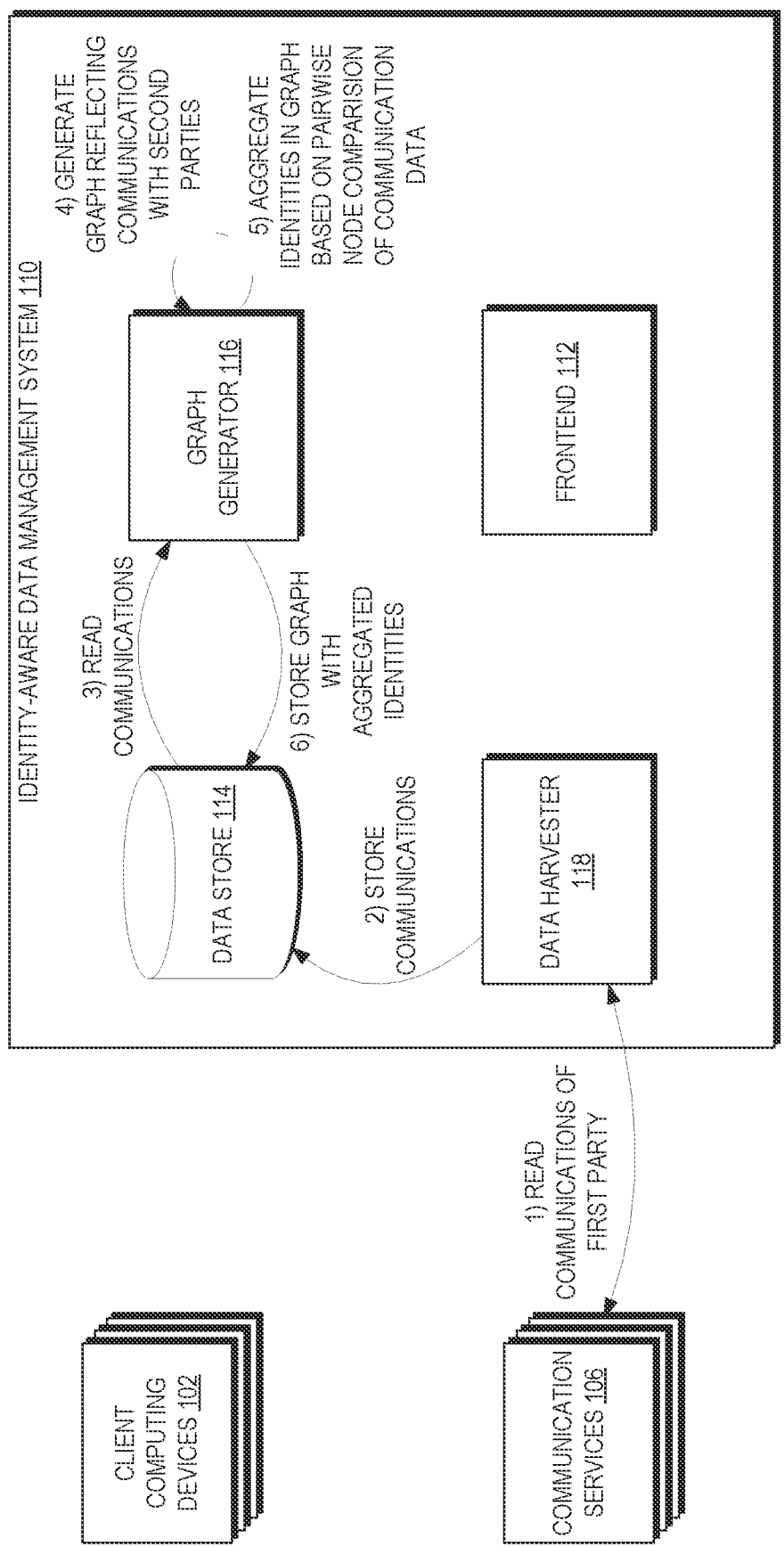
FIG. 3 depicts example interactions on the identity-aware data management system of FIG. 2 to generate a reduced connection graph for an entity.
Figure 4:
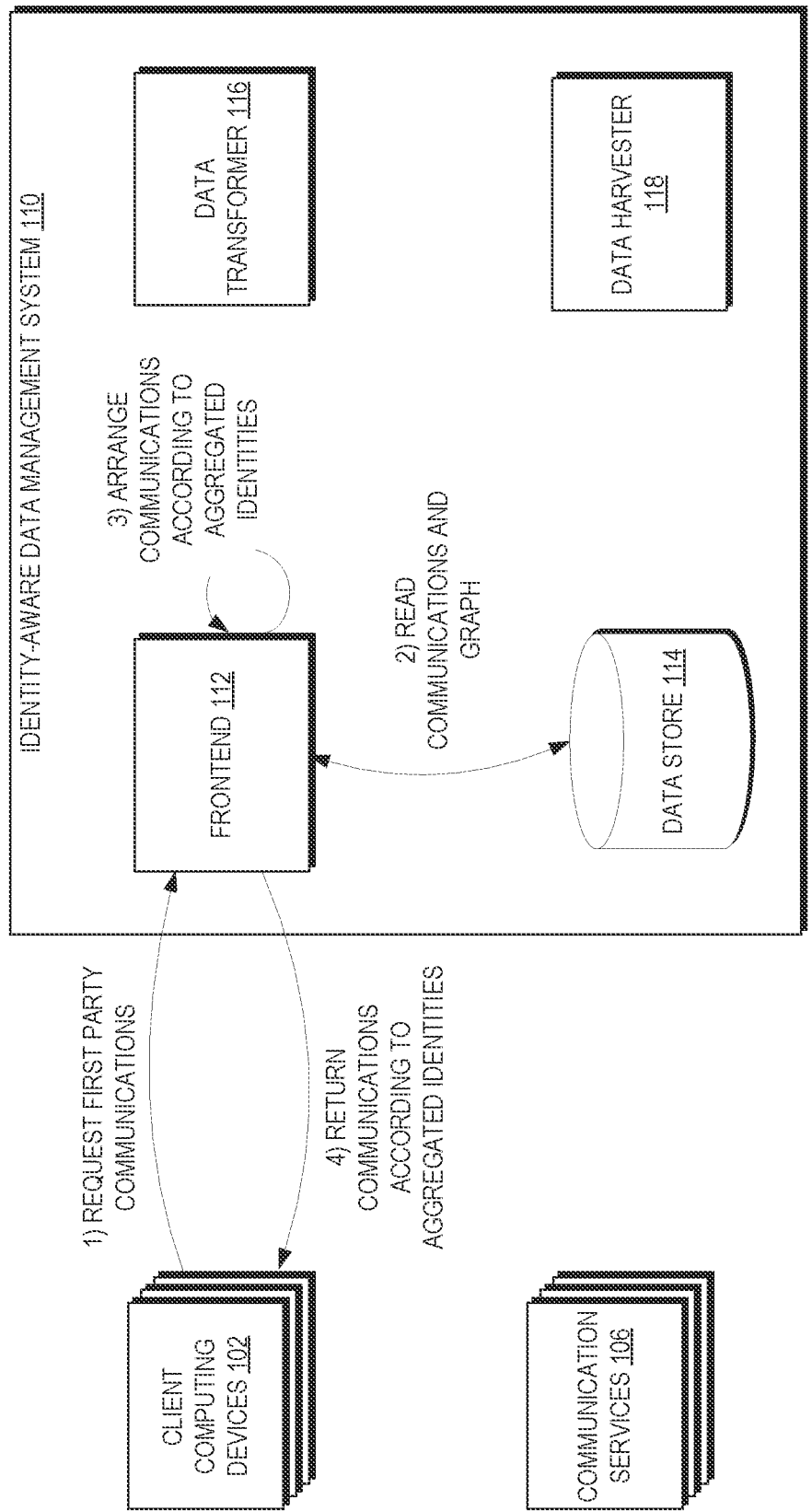
FIG. 4 depicts example interactions on the identity-aware data management system of FIG. 2 to organize data across multiple communication channels for an entity based on a reduced connection graph of the entity.
Figure 5:
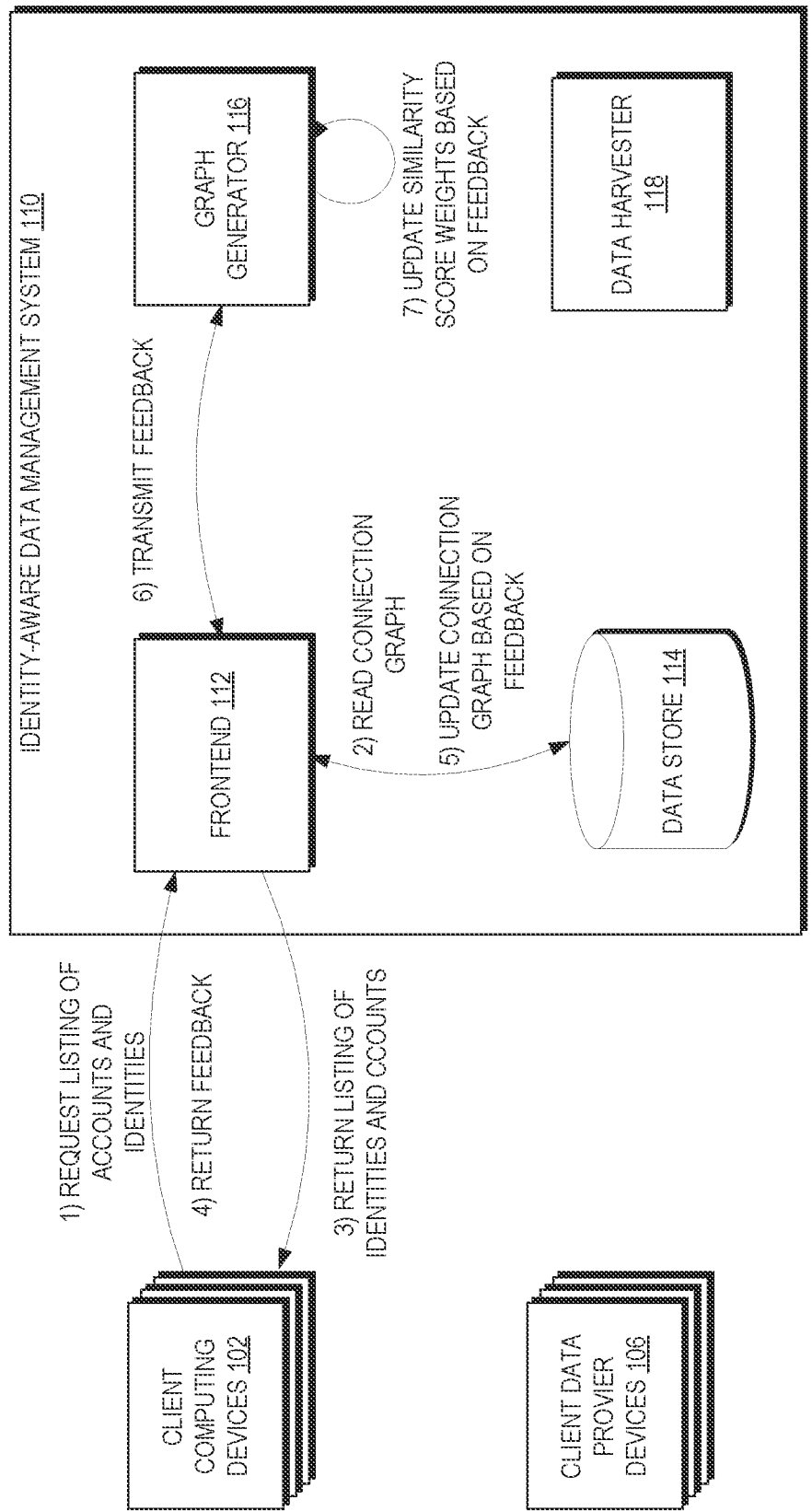
FIG. 5 depicts example interactions on the identity-aware data management system of FIG. 2 to modify generation of reduced connection graphs based on input of an entity.

With reference to FIGS. 3-5, illustrative interactions relating to operation of the identity-aware data management system 110 will be described. Specifically, FIG. 3 depicts illustrative interactions for generation of a reduced connection graph of a first party based on communications of a client retrieved from one or more communication services 106. FIG. 4 depicts illustrative interactions for the use of a reduced connection graph to organize the communications for delivery to a client computing device of a first party. FIG. 5 depicts illustrative interactions for obtaining feedback of the first party regarding aggregated identities in a reduced connection graph and updating a reduced connection graph creation process based on the feedback.

With reference to FIG. 3, the interactions begin at (1), where the data harvester 118 reads communications of a first party from the communication services 106. It is assumed for the purposes of description of FIG. 3 that the first has previously authorized the identity-aware data management system 110 to access such communications, such as by providing to the identity-aware data management system 110 authentication information (e.g., an authentication token) enabling the identity-aware data management system 110 to access communications of the first party on the communication services 106. As discussed above, the communication services 106 may provide a variety of communication channels through which the first party and second parties may communicate. In some instances, channels may be bi-directional, such that the first party and second parties can exchange messages. Examples of bi-directional channels include email, messaging services, social networks, bulletin boards, forums, and the like. In other instances, channels may be uni-directional, such that the first party can communicate information to a second party or vice versa, but the receiving party is not enabled to communicate with the sending party. Examples of uni-directional channels may include publishing platforms such as web logs ("blogs"), newspapers, magazines, etc. Communications within such channels may include individual emails, messages, publications, etc., or collections of such items, such as email threads, message threads, message feeds, or the like. Accordingly, the communications read at (1) may include any information conveyed by a first party to a second party or vice versa, including communications that may not specifically identify receiving parties (e.g., a news article without a designated audience). Reading communications may include, for example, accessing an API of a communication service 106 to retrieve communications, accessing a user interface (e.g., a GUI) to scrape communications, or the like. As noted above, in some embodiments the identity-aware data management system 110 may operate based on metadata regarding communications, without requiring access to communications themselves, and as such interaction (1) may include retrieving such metadata. For ease of description, it should be understood that in connection with the description of FIGS. 3-5, references to communications may additionally or alternatively refer to communications metadata, unless otherwise noted.

On retrieving the communications, at (2), the data harvester 118 stores the communications in the data store 114 for further processing by the identity-aware data management system 110. As noted above, the communications may be encrypted within the data store 114, or otherwise securely stored, to ensure privacy of such communications.

Thereafter, at (3), the graph generator 116 reads the communications from the data store in order to, at (4), generate a connection graph for the first party reflecting communications with or from second parties. Generation of a connection graph can generally include reading communications of the first party in order to identify other accounts participating in such communications. For example, the first party may initially (e.g., when creating an account on the identity-aware data management system 110) indicate accounts on multiple communication services 106 belonging to the first party. These accounts may then be aggregated into an aggregated identity of the first party forming a "hub" or center of the first party's connection graph. Further, each communication may include metadata indicating a set of accounts that are parties to the communication, such as a sending account, one or more receiving accounts, etc. Accordingly, the identity-aware data management system 110 may read such communications and, for each account identified other than an account of the first party, populate a connection graph of the first party with that account. The identity-aware data management system 110 may further populate edges within the graph based on parties to each communication. Nodes and edges may further be modified based on various attributes of the communications. For example, edges may be weighted based on a number of communications, a relative directionality of communications (e.g., whether the first party is the sender or the receiver), or the like. Nodes may be modified to indicate various attributes of each account, such as an identifier of the account (e.g., a unique identifier such as an account ID or a non-unique identifier such as a nickname), the communication service 106 on which the account is held, and the like.

At (5), the graph generator 116 can generate a reduced connection graph from the initial connection graph, aggregating second party accounts of the connection graph into aggregated identities indicating that the accounts are expected to belong to the same second party. In one embodiment, aggregation occurs by conducting a pairwise comparison of each pair of second party account in the connection graph and generating a similarity score for the pair. If the similarity score exceeds a threshold value, the pair may be expected to belong to the same second party. Various metrics may be used in generating a similarity score, including but not limited to a similarity in identifiers (including unique identifiers or non-unique identifiers), a similarity in frequency of communications with the first party, a similarity in relative directionality of communications with the first party, a similarity in group participation, and the like. For example, a second party may re-use a particular unique identifier (e.g., "awesome_user") when creating accounts on multiple communication services 106, and thus accounts with that identifier may be likely to belong to the second party. Similarly, a first party may assign a particular non-unique identifier (e.g., "Mom") to multiple accounts, indicating that these accounts are associated with the same second party. With respect to frequency of communications, a first and second party may communicate via multiple mediums with similar frequency. As such, where a first party communicates with two accounts on different services 106 with similar frequency, a similarity score of the two accounts may be increased. Somewhat similarly, where a first party communicates with two accounts on different services 106 with a similar relative directionality, a similarity score may be increased. In some embodiments, similarity may be based at least partly on a frequency or direction of communication reaching a threshold level. For example, two nodes may be considered more similar if both communicate with the first party entity with at least a threshold frequency of communications (e.g., at least one communication per week, day, etc.), or if both nodes have a directionality of at least a threshold amount (e.g., at least one communication from an account of the first party entity for each n communications to an account of the first party entity).

With respect to group participation, a similar pattern of group participation between two accounts may increase a similarity score, while a dissimilar pattern may decrease that score. For example, a first party and multiple second parties may form a social clique, which may be replicated in account interactions across communication services. Accordingly, a first party may communicate on a first service 106 with a set of n accounts belonging to other members of the clique, and also communicate on a second service 106 with another set of accounts belonging to members of the clique. In one embodiment, graph analysis techniques may be applied to locate different branches of the connection graph with similar node and edge configurations, indicating potential existence of cliques. Accordingly, where two accounts exist within distinct but similar portions of the connection graph, the two accounts may have an increased similarity score. This score may increase further based on known identities of second parties within the connection graph. For example, assume two accounts of a second party are known. Further assume that in one communication channel, the first party communicates with an account of the second party and also an account of unknown identity, and that in a second communication channel, the first party communicates with another account of the second party and another account of unknown identity. The identity-aware data management system 110 may assign a relatively high similarity score to the accounts of unknown identity, as those accounts may belong to another second party forming a clique with the first party and aforementioned second party.

In some embodiments, the identity-aware data management system 110 may utilize content analysis of communications when generated a reduced connection graph. Illustratively, messages to an account may in some cases be expected to include a salutation, which may indicate a name of the account. This name may be used in addition or alternatively to an identifier of the account when conducting a comparison of account identifiers. Similarly, messages from an account may include a signature that may be used in addition or as an alternative to an account identifier for similarity purposes. Still further, messages from an account may in some cases include other contact information of the account. Illustratively, a signature of a second party in an email message may include their contact information on an instant messenger platform, providing a strong indicator that the account sending the email message is shared with the account indicated on the contact information. Still further, communications across different channels with common subject matter may indicate share accounts. Illustratively, if a first party communicates about a given subject with a first account via a first communication channel, and also communicates about the given subject with a second account on a second communication channel, a similarity score of the two accounts may be increased indicating that the two accounts are more likely to be shared.

In some instances, a similarity score of two accounts may be based on the particular communication channel associated with each account being compared. For example, two accounts on the same communication channel may be less likely to be shared by a given second party, particularly if substantial communications occur between the two accounts. Accordingly, a similarity score of two accounts may be lowered if, for example, a first of the two accounts sends a communication to a second of the two accounts. In some instances, channels may be grouped into categories and compatibility scores may be assigned between these categories, which compatibility scores are factored into a similarity score. For example, a personal email address and a personal social network messenger service may be considered compatible, and as such, two accounts on these two communication channels may be more likely to be shared. That is, it may be relatively likely that personal friends both email each other and communicate via the personal social network messenger service. Similarly, a business email address and a business social network messenger service may be considered compatible, and as such, two accounts on these two communication channels may be more likely to be shared. That is, it may be relatively likely that business colleagues both email each other and communicate via the business social network messenger service. Conversely, a business email address and a social network messenger service may be less compatible, and as such, two accounts on these two communication channels may be less likely to be shared. That is, it may be relatively less likely that two parties converse via both business email and a personal social network messenger service.

In one embodiment, one or more of the above criteria are combined to generate a similarity score for each pair of accounts in a connection graph, which is compared against a threshold to determine whether the accounts are expected to be shared by a second party. Illustratively, the score may be generated as a weighted combination of criteria. In one embodiment, weights and the threshold may be manually specified, e.g., by empirical analysis. In another embodiment, weights and the threshold may be programmatically derived, such as by application of machine learning analysis. For example, the identity-aware data management system 110 may initially obtain labeled data including a listing of accounts on various services 106, attributes of the accounts corresponding to the above-noted criteria, and an indication of whether the account is held by the same second party as other accounts (if any) in the list. The identity-aware data management system 110 may thus use such labeled data to train a machine learning model, such as a neural network, which determines whether two accounts are likely held by the same party. For example, the neural network may be trained to assign weights to various criteria as noted above and thereafter to accept as input two accounts and provide as output a classification indicating whether the two accounts are shared.

Still further, in some embodiments the identity-aware data management system 110 may utilize a graph community detection algorithm to detect identities within a graph of second party accounts. For example, on generated a connection graph, the identity-aware data management system 110 may populate the graph with edges between each node representing a second party account, with such edges weighted according to a calculated similarity of the two nodes (e.g., using any one or more of the similarity criteria noted above). These similarity edges may be distinct from the edges discussed above designating interactions between accounts. The identity-aware data management system 110 may then apply a graph community detection algorithm to the nodes and similarity edges in order to detect communities of nodes according to the similarity edges. The identity-aware data management system 110 may then consider a detected community of nodes as corresponding to a given second party identity. In one embodiment, the identity-aware data management system 110 may consider nodes to form a second party identity if the similarity edges connecting the nodes are of sufficient strength, e.g., based on an absolute strength threshold or a strength threshold relative to the strength of similarity edges connecting the community to other nodes. A variety of graph community detection algorithms may be used, including for example hierarchical clustering, the Girvan-Newman algorithm, modularity maximization, statistical inference, and clique-based methods.

On identifying two accounts that are likely shared by a second party, the two accounts may be merged within the reduced connection graph as an aggregated identity. By repeating such a process, multiple accounts may be merged into the aggregated identity (e.g., if a first and second account are likely to be shared, and a second and third account are likely to be shared, all three accounts may be considered as shared). Accordingly, the reduced connection graph can indicate not just accounts with whom a first party communicated, but expected identities of second parties. As discussed below, the reduced connection graph can thereafter be used to search, filter, or organize communications of a first party. Accordingly, the reduced connection graph can be stored, at (6), within the data store 114 to facilitate that later use.

While the interactions of FIG. 3 are described sequentially, these interactions may occur in practice in various patterns. For example, reading and storing of communications (e.g., interactions (1) and (2)) may occur with a first periodicity, while generation of a reduced connection graph (e.g., interactions (3) through (6)) may occur with a second periodicity. Moreover, while FIG. 3 describes interactions related to a single first party, these interactions may include or be repeated for communications of multiple first parties. In some embodiments, data of each first party—including each first party's connection graph—is completely isolated. In other embodiments, such as where consent is provided by each relevant first party, data of different first parties may be shared. For example, where the identity-aware data management system 110 obtains knowledge that two accounts are shared by a given party (e.g., by virtue of the given party being a first party who explicitly links such account, a second party linked to the accounts via a connection graph of another first party, etc.), that knowledge may where appropriate be shared across first parties.

With reference to FIG. 4, illustrative interactions will be described for the use of a reduced connection graph to organize the communications for delivery to a client computing device of a first party. Illustratively, a first party, using a client computing device 102 may desire to use the identity-aware data management system 110 to search for or organize communications on the basis of identities, rather than simply on the basis of accounts. Accordingly, at (1), the first party using the client computing device 102 transmits to the frontend 112 a request for communications of the first party. The frontend 112, in turn, reads such communications from the data store 114 along with a connection graph of the first party (e.g., as stored during the interactions of FIG. 3). The frontend 112 then, at (3), arranges the communications according to aggregated identities within the connection graph. The particular arrangement may depend, for example, on the request from the first party. For example, if the first party searches for communications including a second party, the frontend 112 may locate, within the communications, individual communications that include an account associated with the second party in the connections graph. Thus, the first party can quickly retrieve any communications from the second party, regardless of the particular channel on which or account from which the communication was sent. As another example, if the first party requests to sort all communication by identity, the frontend 112 may group the communications by aggregated identity, enabling the first party to quickly distinguish between communications of different parties and collectively view communications of each second party. This information, arranged according to the aggregated identities in the connection graph, may then be returned to the client computing device 102 for display. For example, the frontend 112 may transmit a web document renderable on a web browser of the client computing device 102 to display the arranged communications. Accordingly, the use of a reduced connection graph can significantly improve the ability of the identity-aware data management system 110, and thus the first party, to retrieve and organize communications.

In some embodiments, additional information on the reduced connection graph may be used to arrange communications. For example, the frequency and directionality of communications to second parties may indicate a relative importance of communications of those second parties to the first party. As an illustration, a second party to whom the first party frequently sends communications may be viewed as more important than a second party to whom the first party rarely sends communications. Accordingly, when for example sorting communications according to aggregated identity, communications of second parties who are expected to be of higher importance to the first party may be prioritized more highly than communications of other second parties.

As noted above, in some embodiments the identity-aware data management system 110 may operate with limited or no access to actual communications of first parties. For example, the identity-aware data management system 110 may not retrieve such communications from communication services 106, or may retrieve such communications only temporarily (e.g., during the interactions of FIG. 3) and later delete such communications. In such embodiments, the interactions of FIG. 4 may be modified accordingly. For example, rather than reading communications from the data store, the frontend 112 may read metadata regarding such communications and transmit to the client computing device 102 of the first party a list of communications (e.g., by unique identifier) relevant to the device 102's request, which list is arranged according to the arrangement of interaction (3). The client computing device 102 may then (e.g., by virtue of client-side scripting executing on the client computing device 102) retrieve the communications identified in the list from the communication services 106 and display such communications in a similar manner to as described above. Thus, the advantages disclosed herein may be maintained while strongly protecting the privacy of a first party's communications.

With reference to FIG. 5, illustrative interactions will be described for obtaining feedback of the first party regarding aggregated identities in a reduced connection graph and updating a reduced connection graph creation process based on the feedback. Illustratively, the programmatically identified aggregated identities of a first party's connection graph may in some cases be incorrect, or two accounts known by a first party to be shared by a second party may not be aggregated by the programmatic operation of the identity-aware data management system 110. Accordingly, the identity-aware data management system 110 may provide interfaces through which a first party may view aggregated identities and accounts and provide feedback, such as an indication that one or more accounts do or do not belong to the identified second party. Interactions for such feedback are shown in FIG. 5. Specifically, as shown in FIG. 5, a first party using a client computing device 102, at (1), requests a listing of aggregated identities and accounts from the frontend 112. The frontend 112, in turn, reads the connection graph of the first party form the data store 114 at (2), and returns the listing of aggregated identities and accounts at (3). The first party, using the client computing device 102, may then at (4) provide feedback indicating that one or more accounts aggregated into the aggregated identity do or do not belong to the identified second party. On receiving such feedback, the frontend 112 can at (5) update the connection graph based on the feedback, such as by aggregating two un-aggregated accounts into an aggregated identity, adding a previously un-aggregated account to an existing aggregated identity, or removing an account from an aggregated identity.

In addition, at (6), the frontend 112 transmits the feedback to the graph generator 116. The graph generator 116, at (7), updates the weights used to calculate similarity scores for accounts based on the feedback. For example, the graph generator 116 may update a machine learning model used to categorize accounts as likely shared or not likely shared based on the feedback provided. In one embodiment, the weights are updated on a per-party basis, such that weights of one first party do not modify weights of another first party. In another embodiment, weights are shared among first parties. Accordingly, the identity-aware data management system 110 may progressively improve the ability to detect accounts shared by a given second party.

Figure 6:
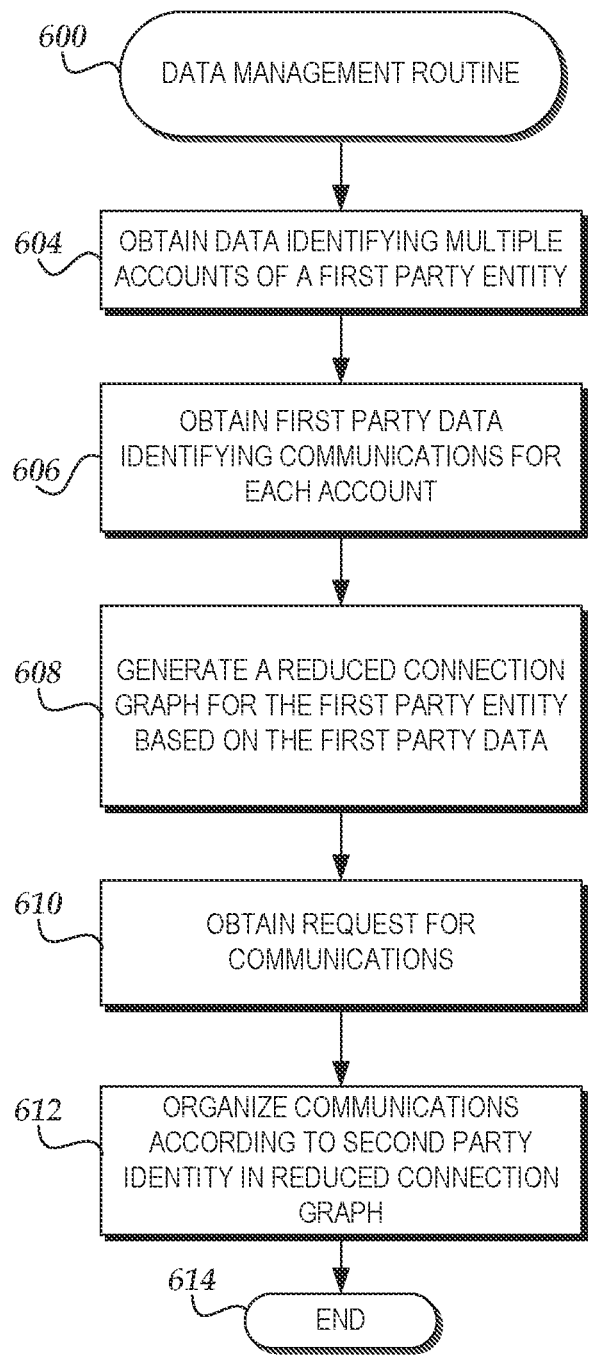
FIG. 6 depicts an illustrative routine for organizing communications of a first party according to a reduced communication graph.

With reference to FIG. 6, an illustrative routine 600 will be described for managing communication data of a first party entity based on generation of a reduced connection graph, as disclosed herein. The routine 600 may be implemented, for example, by the identity-aware data management system 110 of FIG. 2.

The routine 600 begins at block 604, where the identity-aware data management system 110 obtains data identifying multiple accounts of a first party entity. Illustratively, the first party entity, using a client computing device, may create an account on the identity-aware data management system 110 and provide the identity-aware data management system 110 with information identifying the multiple accounts. As discussed above, the multiple accounts may illustratively be spread among multiple communication services. The first party entity may further provide to the identity-aware data management system 110 authentication information, such as authentication tokens, enabling the identity-aware data management system 110 to obtain communications for the multiple accounts from respective communication services.

Accordingly, at block 606, the identity-aware data management system 110 obtains data of the first party identifying communications for each account of the first party. As noted above, the identity-aware data management system 110 may include, for example, a data harvester to collect such communications. For example, communications may be retrieved from an API of a communication service, scraped from a user interface of a communication service, or the like. In one embodiment, the first party data includes the communications. In another embodiment, the first party data includes metadata of communications, but excludes content of the communications.

At block 608, the identity-aware data management system 110 generates a reduced connection graph for the first party based on the first party data. As discussed above, the reduced connection graph may generally aggregate the accounts of the first party into a first party identity, and link the first party identity to multiple second party accounts on the communication services based on detecting communications between the first party accounts and the second party accounts. Illustratively, a connection graph may include nodes representing the first party accounts and the second party accounts and edges connecting such accounts, with an edge indicating a communication between accounts represented by connected nodes. A reduced connection graph may group at least some second party accounts into second party identities based on an analysis of the first party communications or connections in the graph. As discussed above, a variety of criteria may be used to group two accounts, including (but not limited to) identifiers of the at least two accounts, communication frequency of the at least two accounts and the first party entity, communication directionality of the at least two accounts and the first party entity, group participation of the at least two accounts, communication channels associated with the at least two accounts, or content of communications of the at least two accounts and the first party entity. In one embodiment, the identity-aware data management system 110 conducts a pairwise comparison of accounts represented within the connection graph, and for each pair of accounts, generates a similarity score. The identity-aware data management system 110 may then combine accounts into a second party identity based on these similarity scores, such as by combining notes when such score satisfies a threshold or generated similarity edges weighted according to the scores and conducting a graph community detection algorithm with respect to the nodes and similarity edges. In one embodiment, these criteria are combined according to weightings of each criteria in order to generate the similarity score. For example, the criteria may be combined in a weighted combination (e.g., linearly, exponentially, logarithmically, etc.). Alternatively, the criteria may be input into a trained machine learning model, such as a neural network machine learning model, which model assigns weights to the criteria to generate a similarity score.

Thereafter, the identity-aware data management system 110 obtains at block 610 a request for communications of the first party, such as a request to search, filter, sort, or otherwise organize the communications according to second party identities. For example, the identity-aware data management system 110 may obtain a request to search for all communications of a given second party, regardless of the particular account or channel used by the second party. Accordingly, at block 612, the identity-aware data management system 110 organizes the communications of the first party according to one or more second party identities within the reduced connection graph. For example, the identity-aware data management system 110 may search the first party data to locate communications by any account of a specified second party, as indicated in the reduced connection graph. The identity-aware data management system 110 may then return such communications in response to the request. Alternatively, where the request is a request to sort communications, the identity-aware data management system 110 may group communications of the first party based on second party identities within the communication graph, thus enabling communications from the same second party to be viewed collectively, regardless of account of channel used by such second party. In this manner, the identity-aware data management system 110 substantially improves the ability to search for, locate, and organize communications with second parties. The routine 600 then ends at block 614.

Figure 7:
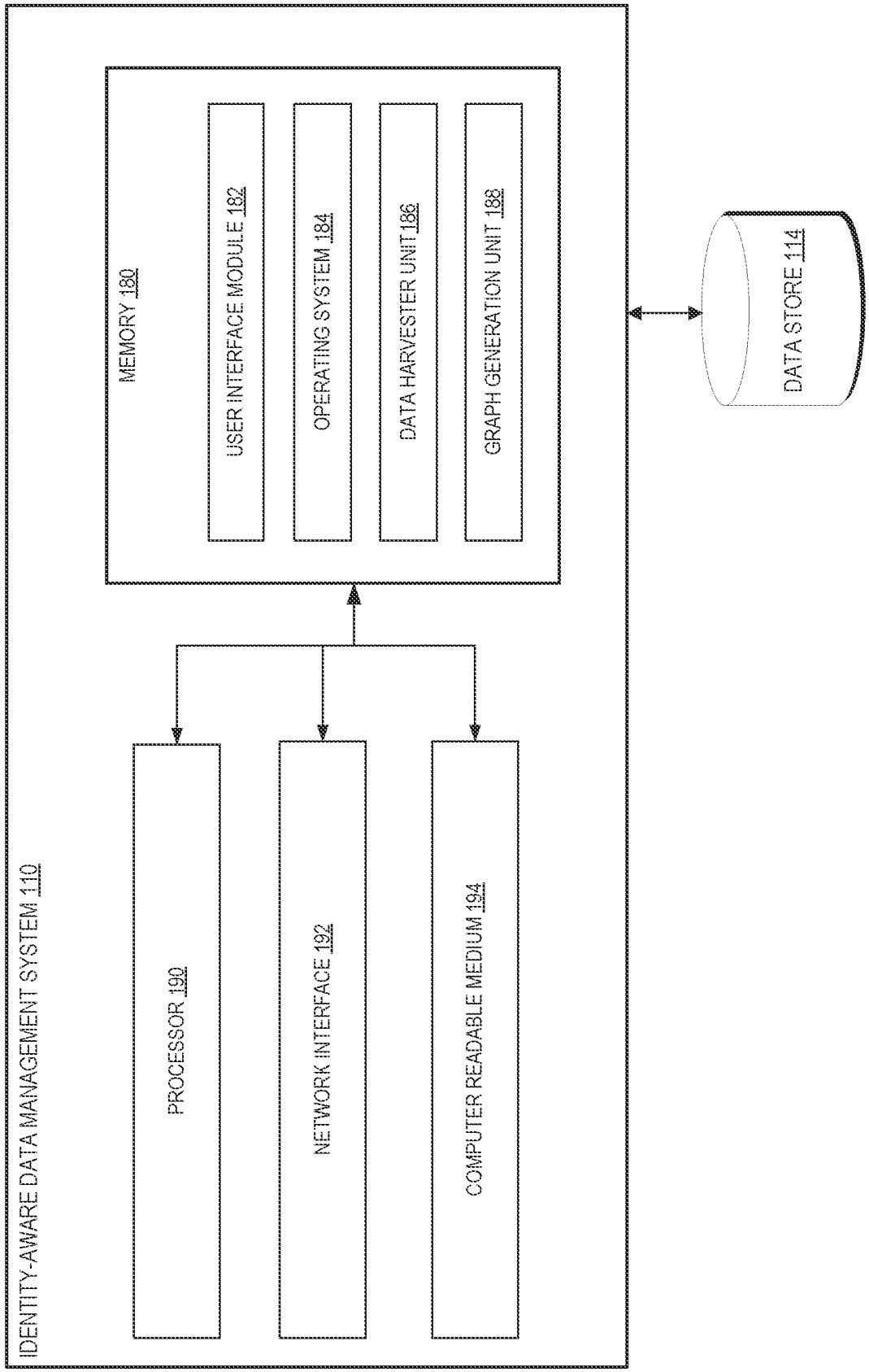
FIG. 7 depicts a general architecture of a computing device or system that can be used to perform one or more of the techniques described herein.

FIG. 7 depicts an example architecture of a computing system (referred to as the identity-aware data management system 110) that can be used to perform one or more of the techniques described herein or illustrated in FIGS. 1-6. The general architecture of the identity-aware data management system 110 depicted in FIG. 7 includes an arrangement of computer hardware and software modules that may be used to implement one or more aspects of the present disclosure. The identity-aware data management system 110 may include many more (or fewer) elements than those shown in FIG. 7. It is not necessary, however, that all of these elements be shown in order to provide an enabling disclosure. As illustrated, the identity-aware data management system 110 includes a processor 190, a network interface 192, and a computer readable medium 194, all of which may communicate with one another by way of a communication bus. The network interface 192 may provide connectivity to one or more networks or computing systems. The processor 190 may thus receive information and instructions from other computing systems or services via the network 104 illustrated in FIG. 2.

The processor 190 may also communicate with memory 180. The memory 180 may contain computer program instructions (grouped as modules or units in some embodiments) that the processor 190 executes in order to implement one or more aspects of the present disclosure. The memory 180 may include random access memory (RAM), read only memory (ROM), and/or other persistent, auxiliary, or non-transitory computer-readable media. The memory 180 may store an operating system 184 that provides computer program instructions for use by the processor 190 in the general administration and operation of the identity-aware data management system 110. The memory 180 may further include computer program instructions and other information for implementing one or more aspects of the present disclosure. For example, in one embodiment, the memory 180 includes a user interface module 182 that generates user interfaces (and/or instructions therefor) for display upon a user computing device, e.g., via a navigation and/or browsing interface such as a browser or application installed on the user computing device.

In addition to and/or in combination with the user interface module 182, the memory 180 may include a data harvester unit 186 and a graph generation unit 188. In one embodiment, the data harvester unit 186 and graph generation unit 188 when executed implements various aspects of the present disclosure, e.g., collecting communications of a first party from communication services, generating a reduced connection graph of the first party from such communications, organizing, searching, or filtering those communications according to the reduced connection graph, and/or other aspects discussed herein or illustrated in FIGS. 1-6. Illustratively, the data harvester unit 186 may include code corresponding to the data harvester 118 and the graph generation unit 188 may contain code corresponding to the graph generator 116.

While data harvester unit 186 and graph generation unit 188 are shown in FIG. 7 part of the identity-aware data management system 110, in other embodiments, all or a portion of the data harvester unit 186 and graph generation unit 188 may be implemented by another computing device. For example, in certain embodiments of the present disclosure, another computing device in communication with the identity-aware data management system 110 may include several modules or components that operate similarly to the modules and components illustrated as part of the identity-aware data management system 110. In some instances, the data harvester unit 186 and graph generation unit 188 may be implemented as one or more virtualized computing devices. Moreover, the data harvester unit 186 and graph generation unit 188 may be implemented in whole or part as a distributed computing system including a collection of devices that collectively implement the functions discussed herein.

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

The processes described herein or illustrated in the figures of the present disclosure may begin in response to an event, such as on a predetermined or dynamically determined schedule, on demand when initiated by a user or system administrator, or in response to some other event. When such processes are initiated, a set of executable program instructions stored on one or more non-transitory computer-readable media (e.g., hard drive, flash memory, removable media, etc.) may be loaded into memory (e.g., RAM) of a server or other computing device. The executable instructions may then be executed by a hardware-based computer processor of the computing device. In some embodiments, such processes or portions thereof may be implemented on multiple computing devices and/or multiple processors, serially or in parallel.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A computer-implemented method for organizing data according to detected identities representing aggregate accounts across multiple communication services, the computer-implemented method comprising:
    obtaining data identifying multiple accounts of a first party entity, each account of the multiple accounts corresponding to a communication service of a plurality of communication services;
    obtaining first party data comprising, for each account the multiple accounts of the first party entity, communication data from the communication service corresponding to the account of the first party entity, wherein the communication data for each account identifies a set of communications, each communication of the set of communication representing an interaction between the first party entity and an additional account on the communication service;
    generating a connection graph for the first party entity based on the first party data, wherein the connection graph associates the first party entity with a plurality of additional accounts represented within the first party data, wherein the connection graph includes a plurality of nodes, each node representing an account of the plurality of additional accounts;
    generating a reduced connection graph for the first party entity, the reduced connection graph aggregating at least two additional accounts of the plurality of additional accounts into a second party identity based on a comparison of communications, within the first party data, between the first party entity and a first account of the least two accounts and interactions, within the first party data, between the first party entity and a second account of the least two accounts;
    obtaining a request from a client computing device of the first party entity for communications of a second party identified by the second party identity; and
    presenting, from the first party data, communications between the first party entity and individual accounts of the at least two accounts combined into the second party identity.

2. The computer-implemented method of claim 1, wherein generating the reduced connection graph for the first party entity comprises conducting a pairwise comparison of the plurality of additional accounts to determine that the at least two additional accounts have a similarity score satisfying a threshold.

3. The computer-implemented method of claim 2, wherein the similarity score is calculated based on criteria comprising one or more of identifiers of the at least two accounts, communication frequency of the at least two accounts and the first party entity, communication directionality of the at least two accounts and the first party entity, group participation of the at least two accounts, communication channels associated with the at least two accounts, or content of communications of the at least two accounts and the first party entity.

4. The computer-implemented method of claim 3, wherein the similarity score is calculated as a weighted combination of the criteria.

5. The computer-implemented method of claim 4 further comprising:
    obtaining feedback from the first party entity indicating whether the at least two additional accounts correctly correspond to the second party identity; and
    adjusting weights used in the weighted combination based on the feedback.

6. The computer-implemented method of claim 3, wherein the similarity score is calculated based on application of a machine learning model to the criteria.

7. The computer-implemented method of claim 6, wherein the machine learning model is a neural network.

8. The computer-implemented method of claim 7 further comprising:

obtaining feedback from the first party entity indicating whether the at least two additional accounts correctly correspond to the second party identity; and retraining the neural network based on the feedback.

9. The computer-implemented method of claim 1, wherein generating the reduced connection graph for the first party entity comprises conducting a pairwise comparison of the plurality of additional accounts to generate similarity edges between individual accounts of the plurality of accounts, and applying a graph community detection algorithm to a graph comprising the similarity edges and the plurality of nodes, wherein the at least two additional accounts of the plurality of additional accounts are aggregated into the second party identity based on nodes corresponding to the at least two additional accounts being identified as a community by the graph community detection algorithm.

10. A system comprising:
a non-transitory data store including computer-executable instructions; and
a processor configured to execute the computer-executable instructions, wherein execution of the computer-executable instructions causes the system to:
obtain data identifying multiple accounts of a first party entity, each account of the multiple accounts corresponding to a communication service of a plurality of communication services;
obtain first party data comprising, for each account the multiple accounts of the first party entity, communication data from the communication service corresponding to the account of the first party entity, wherein the communication data for each account identifies a set of communications, each communication of the set of communication representing an interaction between the first party entity and an additional account on the communication service;
generate a reduced connection graph for the first party entity, wherein the reduced connection graph associates the first party entity with a plurality of additional accounts represented within the first party data, wherein the reduced connection graph includes a plurality of nodes, each node representing an account of a plurality of additional accounts represented within the first party data, and wherein the reduced connection graph aggregates at least two additional accounts of the plurality of additional accounts into a second party identity based on a comparison of communications, within the first party data, between the first party entity and a first account of the least two accounts and interactions, within the first party data, between the first party entity and a second account of the least two accounts;
obtain a request from a client computing device of the first party entity for communications of a second party identified by the second party identity; and
present, from the first party data, communications between the first party entity and individual accounts of the at least two accounts combined into the second party identity.

11. The system of claim 10, wherein to obtain the first party data, the computer-executable instructions cause the system to obtain, from the first party entity, authentication information authenticating the system to each communication service of the plurality of communication services.

12. The system of claim 10, wherein to obtain the first party data, the computer-executable instructions cause the system to implement at least one of: accessing an application programming interface (API) of at least communication service of the plurality of communication services; or scrape a user interface of the at least communication service of the plurality of communication services.

13. The system of claim 10, wherein to generate the reduced connection graph for the first party entity, execution of the computer-executable instructions causes the system to conduct a pairwise comparison of the plurality of additional accounts to determine that the at least two additional accounts have a similarity score satisfying a threshold.

14. The system of claim 13, wherein the similarity score is calculated based on criteria comprising one or more of identifiers of the at least two accounts, communication frequency of the at least two accounts and the first party entity, communication directionality of the at least two accounts and the first party entity, group participation of the at least two accounts, communication channels associated with the at least two accounts, or content of communications of the at least two accounts and the first party entity.

15. The system of claim 10, wherein the request for communications of the second party identified by the second party identity comprises a search for communications of the second party identified by the second party identity.

16. The system of claim 10, wherein the request for communications of the second party identified by the second party identity comprises a request to sort communications of the first party by identities of second parties within the communications of the first party.

17. The system of claim 10, wherein to generate the reduced connection graph for the first party entity, execution of the computer-executable instructions further causes the system to conduct a pairwise comparison of the plurality of additional accounts to generate similarity edges between individual accounts of the plurality of accounts, and apply a graph community detection algorithm to a graph comprising the similarity edges and the plurality of nodes, wherein the at least two additional accounts of the plurality of additional accounts are aggregated into the second party identity based on nodes corresponding to the at least two additional accounts being identified as a community by the graph community detection algorithm.

18. One or more non-transitory computer-readable media comprising computer-executable instructions that, when executed by a computing system, cause the computing system to:
obtain data identifying multiple accounts of a first party entity, each account of the multiple accounts corresponding to a communication service of a plurality of communication services;
obtain first party data comprising, for each account the multiple accounts of the first party entity, communication data from the communication service corresponding to the account of the first party entity, wherein the communication data for each account identifies a set of communications, each communication of the set of communication representing an interaction between the first party entity and an additional account on the communication service;
generate a reduced connection graph for the first party entity, wherein the reduced connection graph associates the first party entity with a plurality of additional accounts represented within the first party data, wherein the reduced connection graph includes a plurality of nodes, each node representing an account of a plurality of additional accounts represented within the first party data, and wherein the reduced connection graph aggregates at least two additional accounts of the plurality of additional accounts into a second party identity based on a comparison of communications, within the first party data, between the first party entity and a first account of the least two accounts and interactions, within the first party data, between the first party entity and a second account of the least two accounts;

obtain a request from a client computing device of the first party entity for communications of a second party identified by the second party identity; and present, from the first party data, communications between the first party entity and individual accounts of the at least two accounts combined into the second party identity.

19. The one or more non-transitory computer-readable media of claim 18, wherein to generate the reduced connection graph for the first party entity, execution of the computer-executable instructions causes the computing system to conduct a pairwise comparison of the plurality of additional accounts to determine that the at least two additional accounts have a similarity score satisfying a threshold.

20. The one or more non-transitory computer-readable media of claim 19, wherein the similarity score is calculated based on criteria comprising one or more of identifiers of the at least two accounts, communication frequency of the at least two accounts and the first party entity, communication directionality of the at least two accounts and the first party entity, group participation of the at least two accounts, communication channels associated with the at least two accounts, or content of communications of the at least two accounts and the first party entity.

21. The one or more non-transitory computer-readable media of claim 20, wherein the instructions, when executed by a computing system, further cause the computing system to:

obtain feedback from the first party entity indicating whether the at least two additional accounts correctly correspond to the second party identity; and adjust weights used in calculating the similarity score based on the feedback.

22. The one or more non-transitory computer-readable media of claim 21, wherein adjusting weights used in calculating the similarity score based on the feedback comprises retraining a neural network machine learning model based on the feedback.

* * * * *